Feb. 24, 1959 G. D. JOHNSON Re. 24,609

WELL HEAD CONTROL

Original Filed May 13, 1953 2 Sheets-Sheet 1

INVENTOR.
GLENN D. JOHNSON,
BY
ATTORNEY.

WELL HEAD CONTROL

Original Filed May 13, 1953 2 Sheets-Sheet 2

INVENTOR.
GLENN D. JOHNSON,
BY
C. E. Weaver
ATTORNEY.

United States Patent Office

Re. 24,609
Reissued Feb. 24, 1959

24,609

WELL HEAD CONTROL

Glenn D. Johnson, Houston, Tex., assignor, by mesne assignments, to Joy Manufacturing Company, Pittsburgh, Pa., a corporation of Pennsylvania Original No. 2,771,956, dated November 27, 1956, Serial No. 354,901, May 13, 1953. Application for reissue February 6, 1958, Serial No. 713,774

22 Claims. (Cl. 166—88)

Matter enclosed in heavy brackets [ ] appears in the original patent but forms no part of this reissue specification; matter printed in italics indicates the additions made by reissue.

This invention relates to apparatus whereby various operations can be performed during drilling and completion of a deep well such as an oil well while maintaining the well under complete control at all times. The invention also relates to units of equipment and assemblies for use at a well head whereby operations normally performed during drilling and completion of a well (such as the running and setting of production casing or pipe and tubing) can be carried out without removing blowout preventers.

Superatmospheric pressures exist (or may be suddenly encountered) in many wells and the drilling or producing operations must be carried out while the pressure in the well is confined. Blowout preventers are used on most wells, the blowout preventers comprising devices carried by a drilling riser (generally below the level of the drilling table and above the casing head) such devices being capable of sealing the annular space between an inner pipe, casing or the like and the surface string of casing or the inner portion of the blowout preventer. Various forms of blowout preventers are known in the art, for instance see Patent Nos. 1,967,417, 2,044,590, 2,067,499, and 2,194,255.

Heretofore whenever a string of production casing, pipe or tubing (any string smaller in diameter than the surface casing connected to the casing head) was being landed or connected to its component or correlated surface unit, it was necessary to remove the blowout preventers and this resulted in hazard since the well was not under complete control while the preventers were removed. Furthermore, the removal and reinstallation of the preventers was time consuming and costly.

The present invention permits the setting, cementing and landing of production pipe and casing through a surface casing without removing the blowout preventers.

Furthermore, the prior well head assemblies often reached excessive heights being composed of numerous casing head elements, spools, etc., with a large number of joints therebetween. The arrangements and units of the present invention perform dual functions and cooperate to reduce the overall height of a well head assembly. Elements carried by production pipe or casing in accordance with the present invention can be introduced through blowout preventers and not only serve to support the production pipe or casing but also seal off and control the pressure between such production pipe or casing and the next larger size of casing and also act as a seat for tubing plugs and other devices associated with subsequent strings of pipe of even smaller diameter.

An object of the present invention, therefore, is to disclose and provide apparatus whereby a tubing head may be lowered through a blowout preventer, conductor pipe or other fluid-control device positioned above a casing head, be caused to be seated in a casing head and be caused to support a tubing hanger. The term tubing head as used herein refers to any head attached to the upper end portion of a string of pipe (which pipe is sometimes referred to as production pipe or intermediate casing), such head being arranged and adapted to receive and support a tubing hanger, tubing plug or tubing suspension member; the terms tubing plug, tubing hanger, or tubing suspension member refer to a member carried by the upper end of a smaller pipe, such member being capable of seating upon and being supported by the tubing head. It will be evident that in some instances (where a series of strings of pipe are in concentric relation) a tubing hanger or tubing suspension member may also act as a tubing head for another superimposed tubing suspension member attached to a pipe or tubing of smaller diameter than that connected to the tubing head.

A further object of the invention is to disclose and provide apparatus for facilitating well head operations whereby production casing, pipe and tubing of diminishing size can be run into a well, landed, cemented and properly connected to surface equipment without removing the blowout preventers.

A still further object of the invention is to disclose and provide novel types of tubing heads and the like capable of being carried by a production casing and used for properly suspending such pipe or production casing from a casing head, effectively sealing off and controlling pressure in the annulus surrounding such production pipe or casing and functioning as a seat for internally disposed tubing or pipe of smaller diameter than the production string or casing.

Furthermore, an object of the present invention is to disclose and provide landing adapters, tool guides and other units adapted to facilitate the cementing and landing operations below blowout preventers without necessitating the removal of such blowout preventers.

These and various other objects and advantages of my invention will become apparent from the following detailed description of certain exemplary forms of devices embodying the invention here disclosed.

Figure 1:
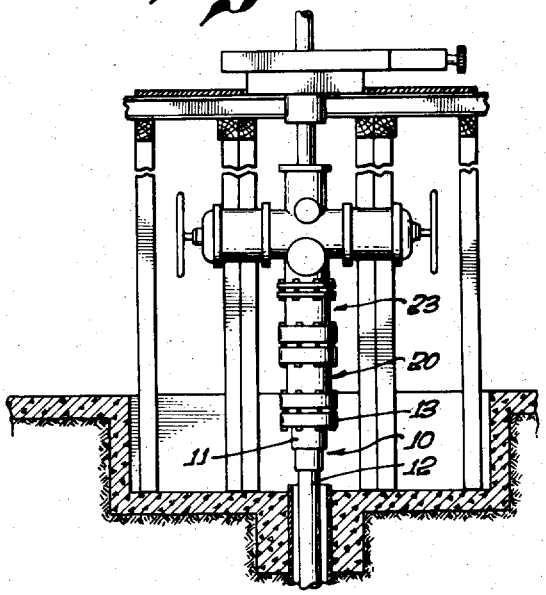
Fig. 1 is a general exterior view of the upper portion of a well.
Figure 2:
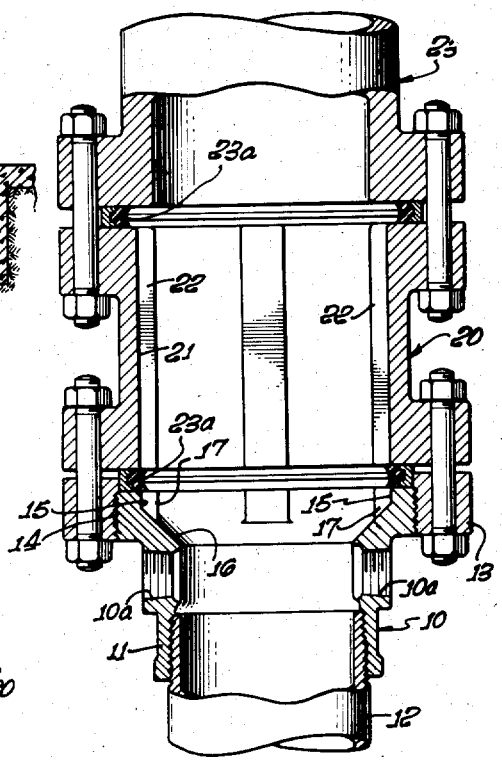
Fig. 2 is a vertical, sectional view showing the casing head, guide spool, and drilling riser assembled.

In the illustrative form of apparatus that appears in the drawings, Fig. 2 shows the external members of the well control assembly, including a casing head 10, a guide spool 20 and a drilling riser portion 23 of a blowout preventer. The relationship of these members to the surface equipment of a well is shown schematically in Fig. 1, which includes a portion of the derrick floor, a rotary table and drill stem, and a blowout preventer at the end of the drilling riser 23 as well as the external members of the well control assembly. It is to be understood that the assembly above the casing head 10 may include two blowout preventers or a conductor pipe, all of these being fluid-control devices which normally have to be removed when a tubing or intermediate casing head is to be set. *The blowout preventer or preventers provide a conventional through bore through which the production tubing may be passed without removing the preventer or preventers from the drilling riser.*

Casing head 10 comprises a lower sleeve portion 11 proportioned to receive and engage the upper end of a string of surface casing 12. The casing head may be secured to the casing by internal threads provided in the sleeve portion 11 or by welding, as preferred. The casing head illustrated is provided with a removable flange 13 removably connected to the upper portion of the casing by means of threads 14. The upper portion of the flange ring 13 may extend above the upper end of the casing to form a retaining shoulder for suitable packing rings.

Casing heads for use in the present invention should include a landing surface upon which a tubing head of the novel character hereinafter described can be seated, and such landing surface can be horizontal, inclined, or of any other form adapted to cooperate with a seat carried by a tubing head. The form shown has an internal, cylindrical bowl 15 and a frusto-conical, downwardly inclined landing surface 16. Vertical guide ribs 17 may be provided in the wall of bowl 15. Lateral outlets 10a for mud fluid or production are formed in the skirt of the casing head and provided with removable plugs that may be replaced with appropriate control fittings when desired.

Supported upon casing head 10 is a conductor pipe, guide spool or riser. The drawings show a guide spool 20 provided in the usual manner with outwardly extending upper and lower flanges and bolt holes which receive bolts connecting such spool to flange 13 and to the drilling riser 23 leading to a blowout preventer. Spool 20 may also have internal, integral, longitudinal guide ribs 22, the inner diameter being equal to the diameter between ribs 17 of the casing head. Spaces between ribs 17 and ribs 22 form fluid channels.

Suitable pressure sealing means 23a are employed between the riser of the blowout preventer and the spool and between the spool and casing head 10.

A tubing head is provided, such tubing head distinguishing from prior heads in that it is adapted to be lowered through whatever fluid-control device is employed in the well head assembly. A tubing head, in the preferred form, does not have outstanding flanges and does not have an outside diameter greater than the bowl of a casing head. Instead, the tubing head has a seat adapted to cooperatively engage the landing surface of a casing head, seal means to cooperate with the casing head and a landing surface upon which a tubing suspension member or tubing hanger can be seated.

The exemplary form of tubing head 24 shown in the drawings and adapted to be lowered through a blowout preventer (thereby permitting intermediate casing to be set or landed without the dangers incident to removal of blowout preventers) is provided with a longitudinal bore *25* extending its entire length. The lower portion of the bore 25 is substantially cylindrical and is provided with internal threads adapted to receive and engage the threaded end of a string of pipe or casing, such as *an inner* producing casing 26. The upper portion of the bore flares outwardly and upwardly, forming a frusto-conical entry portion 27. The lower outer portion of the tubing head is provided with an enlarged upset head 28 of such diameter that it will pass through the *through bore of the* blowout preventer and will also pass through and be guided and centered by guide ribs 22 in spool 20 and guide ribs 17 in casing head 10. The lower surface of upset head 28 is provided with a downwardly directed conical seating surface 29 adapted to engage and seat on landing surface 16 of the casing head. Conical seating surface 29 is provided with pressure sealing means 30 that form a pressure seal when seated on landing surface 16. This sealing means may be in the form of an annular packing ring seated in a suitable groove 31 in conical seating surface 29. The upper, external portion of the tubing head 24 is provided with coupling means such as external threads 32, preferably of the quick-releasing type.

The portion of the tubing head between external threads 32 and lower upset head 28 is provided with a lateral production outlet or outlets 33. The outlet or outlets are preferably provided with removable plugs that may be replaced with appropriate control fittings when the well has been completed and the blowout preventer and guide spool have been removed.

Figure 3:
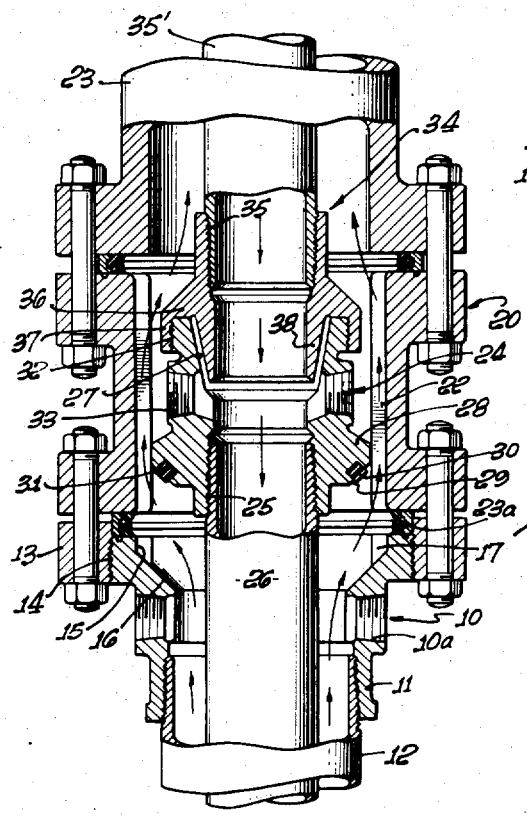
Fig. 3 is a vertical, sectional view showing the tubing head in up position with a landing adapter and a landing nipple attached to the tubing head.

When a string of production pipe, such as string 26, is being set, cemented and landed, the upper end of tubing head 24 is preferably provided with a landing adapter 34 and an upwardly extending landing nipple 35' as shown in Fig. 3. Landing adapter 34 is also capable of passing through the blowout preventer and is provided with an internal bore extending throughout its entire length. Upper portion 35 of the bore is provided with threads to receive and engage the threaded end of upwardly extending landing nipple 35' that serves to manipulate the upper end of the production casing and attached tubing head through the blowout preventer and spool. Landing adapter 34 has a centrally positioned, radially outwardly extending shoulder 36 provided with a downwardly depending annular lip 37. The inner surface of lip 37 is provided with threads corresponding to the external threads 32 corresponding to the external threads 32 of tubing head 24 that permit the landing adapter to be attached thereto.

Landing adapter 34 is also provided with a downwardly extending skirt 38 that enters the flaring entry portion 27 of tubing head 24 to a point immediately above the small bore of the latter. The internal diameter of skirt 38 preferably corresponds to the small bore of tubing head 24. The purpose of the projecting skirt extending from the lower end of shoulder 36 of the landing adapter is to facilitate the free passage of cement plugs (not shown) employed during cementing operations.

Figure 4:
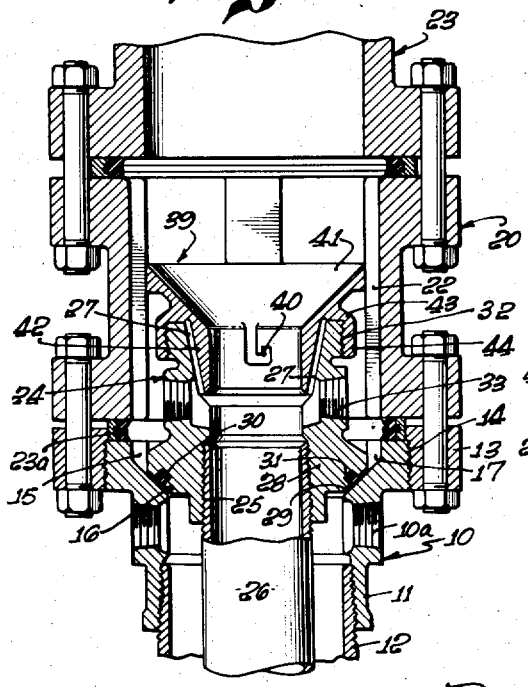
Fig. 4 is a vertical, sectional view showing the tubing head seated and a tool guide secured to the upper end of the tubing head.

Fig. 4 shows the tubing head and casing landed and in condition for subsequent well operations such as drilling. The landing adapter and landing nipple have been unthreaded from the upper end of the tubing head and a tool guide 39 has been installed in the upper end of the tubing head. The upper portion of the tool guide comprises a funnel-shaped section 41 having maximum external diameter proportioned to permit the tool guide to pass through the blowout preventer and also to pass through and be guided and centered by ribs 22 in the guide spool. A lower skirt portion 42 extends downwardly from funnel-shaped section 41 into the flaring entry portion 27 of the tubing head.

The lower portion of the funnel-shape portion is provided with a radially, outwardly extending shoulder 43 having a downwardly depending annular lip 44 provided with internal threads for engaging *the* external threads 32 of the tubing head. The internal diameter of skirt portion 42 of the tool guide preferably corresponds to the internal diameter of the casing string immediately adjoining the tool guide. The lower portion of funnel-shaped member 41 is provided with appropriately formed slots 40 that extend into the upper portion of skirt 42 preferably in the form of J slots to facilitate assembly.

Figure 5:
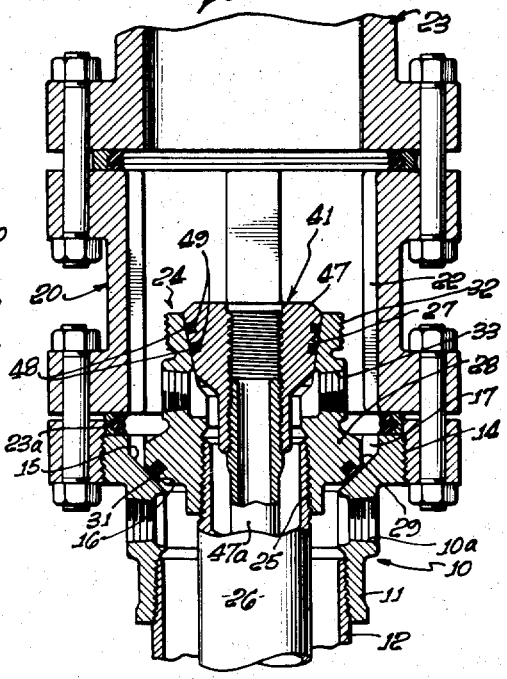
Fig. 5 is a vertical, sectional view showing the tubing head seated, and a tubing suspension plug seated in the tubing head.

Fig. 5 shows a tubing suspension plug *or hanger* 47 seated in flaring entry portion 27 of tubing head 24. Tubing suspension plug 47 is frusto-conical in form and has an external configuration corresponding to the outline of the tubing head entry portion 27. The frusto-conical seating surface of plug 47 is provided with sealing means that may be in the form of an annular sealing ring or rings 48 seated in appropriate grooves 49 in the contact surface. Tubing suspension plug 47 is provided with a threaded bore extending therethrough and adapted to receive and engage the threaded end of a tubing string 47a. The upper portion of the threaded bore is adapted to receive and engage a tubing landing nipple (not shown) that may be attached to the tubing suspension plug through the blowout preventer, to manipulate and seat the plug.

The manner in which the equipment described above is assembled and utilized is as follows: Casing head 10 is attached to the upper end of surface casing 12. Removable flange [19] *13* is threaded to the casing head and guide spool 20 is placed in position and secured to flange [19] *13*. A suitable sealing means 23a, is inserted between casing head 10 and guide spool 20 and clamped between them forming a pressure-tight joint. A blowout preventer of any desired type provided with a drilling riser 23 is secured to the upper end of guide spool 20. The joint between the guide spool and the drilling riser of the blowout preventer is also made pressure-tight by employing a second sealing means 23a, placed between guide spool 20 and drilling riser 23 and clamped between them.

Tubing head 24 is secured to the end of casing string 26 that is being lowered into the well preparatory to suspending it from the casing head. Landing adapter 34 is attached to external threads 32 of tubing head 24 and the upwardly extending landing nipple 35' is threaded into the upper bore portion of landing adapter 34. Landing nipple 35' permits the tubing head to be manipulated and seated in the casing head through the blowout preventer.

When it is necessary to cement casing or pipe in the well, this operation may also be performed through the blowout preventer by using the novel equipment described above in the following manner. The lower end of the tubing head 24 is attached to the upper end of casing 26 and landing adapter 34 is attached to the upper end of the tubing head to releasably connect landing nipple 35' to the tubing head. The casing or pipe is run into the well until the tubing head seats on the casing head. The casing and tubing head are then elevated a sufficient distance above seating surface 16 to permit upwardly circulating well fluid to bypass the tubing head and flow through the fluid channels between ribs 22 and 17 during the cementing operation, guide ribs 22 and 17 holding the tubing head and casing centered at all times. Cement is forced into the well and immediately following the cementing operation the tubing head can be lowered into sealing and supporting position, or it can be held in the elevated position until such time as the cement has become set, after which it is lowered into seating position. It may be noted that when the entire weight of casing 26 is to be suspended from the casing head 10 and tubing head 24, the tubing head 24 is lowered immediately after the cement has been pumped down; however, if a portion of the casing weight is to be borne by the cement, and the balance supported by the tubing head, the latter is positioned a calculated distance above the seat during the cementing operation and is not lowered into the seating position (or the stretch in the string of casing 26 is not allowed to draw tubing head 24 into seated position) until such time as the cement has become set. The distance the tubing head is elevated above its seated position while the cement is setting governs the proportion of total weight of the casing supported by the tubing head support and the cement.

After the casing or pipe has been landed and/or cemented and the tubing head has been seated on the casing head landing surface, the landing adapter and landing nipple are removed by unthreading them from the tubing head. When additional operations, such as drilling, are to be performed, a tool guide is passed down through the blowout preventer and attached to the upper end of the tubing head to facilitate the introduction of drills or other tools in the well. This may be done by employing a setting tool (not shown), normally provided with radially extending pins that engage the slots, such as J slots 40, provided in the tool guide.

When the well is ready to receive tubing, the tool guide is removed and tubing is run into the well through the blowout preventer. Tubing suspension plug or hanger 47 is secured to the upper end of the tubing string and is also lowered through the blowout preventer and seated in entry portion 27 of the tubing head to which it is sealed by the sealing rings 48. In lowering the tubing and tubing suspension plug into position as above described, a landing nipple or joint of tubing is threaded into the upper end of the tubing plug to facilitate this operation.

Figure 6:
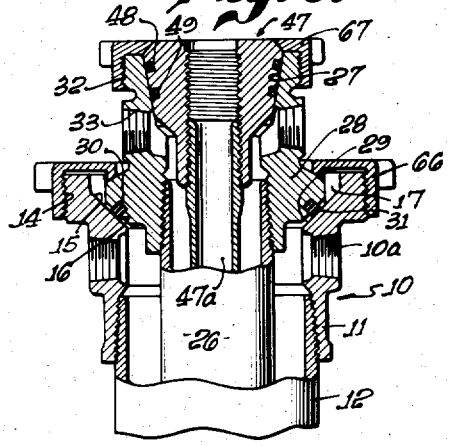
Fig. 6 is a vertical, sectional view showing a tubing head and tubing suspension plug installed in a completed well.

On completion of the well following the running and landing of the tubing, spool 20 with the attached drilling riser 23 and blowout preventer may be unflanged from the casing head and removed as shown in Fig. 6. A tubing head hold-down ring 66 is threaded to the external threads 14 of the casing head and engages the upper portion of upset head 28, clamping the tubing head to the casing head and sealing the upper end of the annular space between the casing or pipe attached to the tubing head and the surface casing. A tubing plug hold-down ring 67 is threaded on the external threads 32 of the tubing head and engages tubing suspension plug 47, clamping the plug in place to the tubing head and sealing the upper end of the annular space between the casing attached to the tubing head and the tubing attached to the tubing plug. The proper manifolds and control equipment may then be installed in the upper end of the tubing plug, the lateral production outlets of the tubing head and the lateral production outlets of the casing head, as desired.

It sometimes occurs that it is not possible to land tubing head on the casing head seating surface 16 as shown in Figs. 4 and 5, due to mismeasurement or to the casing becoming lodged at an elevation in the well above the desired setting depth. To overcome these difficulties, an optional tubing head assembly of the type shown in Fig. 7 may be substituted in place of the preferred form of tubing head shown in Figs. 3, 4, 5 and 6. When this embodiment is employed, the casing head, flange, spool and blowout preventer remain the same as heretofore and all operations may be performed through the blowout preventer.

Figure 7:
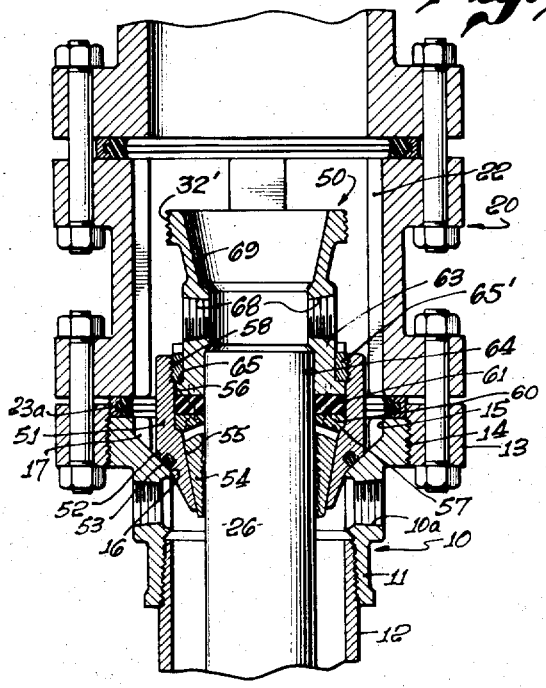
Fig. 7 is a vertical, sectional view showing a modified form of a tubing head.

The modified form 50 of the tubing head, *shown in Fig. 7*, may be said to consist of two subassemblies, the lower comprising an outer spider 51 having a seat 52 carrying a sealing means 53 adapted to seat upon landing surface 16 of casing head 10, and a set of slips 54 adapted to grasp the pipe or casing 26, said slips cooperating with internal, inclined surface 55 of the spider. The minimum internal diameter of spider 51 is larger than the outer diameter of casing 26 (and couplings carried thereby) to allow free movement of the string of casing through the spider. The upper portion of the spider 51 is provided with a larger bore 56 terminating at an upwardly directed shoulder 57. Internal threads 58 are formed in the inner upper surface of such bore 56.

The other subassembly comprises a gland ring 60 (adapted to rest on shoulder 57 above slips 54), a ring of packing 61 and the body 63. Cap screws are used to hold 60, 61 and 63 together. Body 63 has a through bore 64 adapted to slidably receive casing 26. The outer surface of body 63 is formed with a shoulder 65 upon which a ring nut 65' may rest, this nut engaging threads 58 of the spider 51. External threads 32' are formed in the upper end of body 63. Suitable lateral outlet ports 68 (with removable plugs therein) are provided. Finally, and most important, a landing surface 69 is provided in the body 63, such landing surface being adapted to receive a tubing hanger or other suspension member.

The installation of the alternate tubing head described above, where the casing has been cemented, or become lodged at its lower end and is extending too far above the casing head, may be performed without removing the blowout preventer or releasing tension on the casing. This is accomplished as follows. The spider 51 and conventional slip means 54 adapted to seat on the internal upwardly expanding surface of the spider are placed around the casing head and lowered until seating surface 52 of the spider rests on landing surface 16 of the casing head. This may be accomplished by utilizing a special tubular manipulator (not shown) that is threaded to internal threads 58 at the upper end of the annular portion of the spider. When the spider is seated and the slips have engaged the outer surface of the pipe or casing, the manipulator is removed through the blowout preventer. A casing cutter (not shown) is then lowered through the blowout preventer and the casing is cut at the desired point above the slips and the cutter and the cut section of tubing are removed from the well.

The other subassembly (including ring 60, packing 61 and body 63) is then lowered through the blowout preventer by the use of an adapter (such as 34 shown in Fig. 3) and a length of landing nipple such as 35'. The adapter 34 is caused to engage the external threads 32' of the body of the tubing head 50. The subassembly is lowered into position so that the gland ring 60 rests on shoulder 57. The adapter 34 is then unthreaded from the tubing head 50 and removed upwardly through the blowout preventer. Following this, a special tubular ring adapted to fit the torque-transmitting slots or castellations in the upper face of ring 65' is lowered through the blowout preventer on a suitable length of nipple and the ring nut 65' is tightened by being threaded into threads 58. Such threading and tightening causes the body 63 to move downwardly compressing the packing ring 61 against the gland ring 60, thereby forming a tight seal between the tubing head 50 and casing 26. The threading of the ring nut is accomplished by means of a suitable wrench. In some instances the ring nut 65' may be made in two sections in order to permit it to be assembled around the tubing head body, such sections being suitably interconnected.

The novel well control assembly and methods described above permit all drilling, casing, cementing, tubing and completion operations in a well to be performed through an installed blowout preventer and do not require that the blowout preventer be removed from the well head at any stage of the operations. This is particularly important where formation pressures are high or subject to fluctuation. In contrast to the above, the customary apparatus and methods in use require that the blowout preventer be removed from the well head whenever casing or tubing of diminishing size is to be placed in the well and again when the casing or tubing is to be connected to component surface equipment. The removal and reinstallation of the blowout preventer is undesirable since it is time-consuming and costly and considerable hazard is involved.

My invention furthermore provides novel types of tubing heads that are capable of supporting pipe or production casing from the casing head, thus effectively sealing and controlling the annular space between the production casing and the surface casing as well as the annular space between the production casing and the tubing string supported by the tubing head. The modified form of tubing head may be effectively employed where the production casing has become cemented or lodged in the well and extends above the casing head a greater distance than required.

In some instances the operator may for certain reasons plan to use the preferred type of tubing head and later switch to the alternate tubing head after running and cementing casing. Since the arrangement of the casing head flange and spool is the same regardless of which type of tubing head is used the alternate type of tubing head may be used to replace the preferred form of tubing head without disturbing or otherwise changing the assembly or removing the blowout preventer.

The above description of my invention is only exemplary and it is not intended that the invention is to be limited to the exact details set forth herein which may be varied without departing from the spirit of the invention set forth in the appended claims.

I claim:

1. In apparatus for facilitating well head operations wherein the surface equipment includes a blowout preventer above a casing head, the provision of: a casing head adapted to be connected to casing, the upper portion of said casing head including an outwardly and upwardly expanding frusto-conical landing surface; a guide spool supported on said casing head and below a blowout preventer, said guide spool including inwardly and longitudinally extending guide ribs with fluid channels therebetween; a tubing head adapted to be passed through a blowout preventer, said tubing head having a through bore, means carried by the lower portion of the tubing head for connecting the same with a string of pipe and including a downwardly directed, conical seating surfaces provided with seal means adapted to seat on the landing surface of said casing head, an upper portion provided with a coupling means and an outwardly and upwardly flaring entry portion, and a removably plugged lateral production outlet between said upper and lower portions, whereby rising circulating fluid may bypass the tubing head through said fluid channels when the tubing head is within said guide spool, and said circulation shut-off and the string of pipe connected to the tubing head supported by the casing head when the seating surface of the tubing head rests upon the landing surface of the casing head.

2. Apparatus of the character stated in claim 1, including a removable landing adapter attachable to the upper end of the tubing head, said adapter including a skirt extending into the flaring entry portion of the tubing head, whereby a virtually uniform bore is established through said tubing head and passage of cementing plugs therethrough is facilitated.

3. Apparatus of the character stated in claim 1, including a tool guide removably attached to the upper end of the tubing head, said tool guide being provided with an enlarged, upwardly and outwardly directed funnel guide and a central skirt extending downwardly into the flaring entry portion of the tubing head.

4. Apparatus of the character stated in claim 1, including a tubing plug provided with means for connecting the same to a string of tubing, said tubing plug including a downwardly directed conical head provided with sealing means adapted to cooperatively seat on the flaring entry portion of the tubing head, whereby the tubing may be suspended from the tubing head, the annular space between the tubing and string of pipe being in communication with the lateral plugged outlet of the tubing head.

5. A casing head adapted to be connected to a well casing comprising: a lower sleeve portion adapted to receive and engage a casing; an upper enlarged portion provided with means for attaching the casing head to another unit and having an internal cylindrical surface larger in diameter than the internal diameter of said sleeve portion; an intermediate portion joining said upper enlarged portion and said sleeve portion, said intermediate portion having an internal, upwardly and outwardly expanding frusto-conical landing surface; and longitudinal guide ribs extending inwardly from said internal cylindrical surface forming channels for fluid therebetween.

6. A casing head adapted to be connected to a well casing comprising: a lower sleeve portion adapted to receive and engage a casing; an upper enlarged portion provided with external threads and having an internal cylindrical surface larger in diameter than the internal diameter of said sleeve portion; an intermediate portion joining said upper enlarged portion and said sleeve portion; said intermediate portion having an internal, upwardly and outwardly expanding frusto-conical landing surface; and a removably plugged production outlet in said intermediate portion between said frusto-conical landing surface and said sleeve portion.]

7. A tubing head means for attaching to a string of casing and for supporting a tubing string and adapted to be passed through a blowout preventer, comprising: a tubing head body having a through bore, the upper end portion of said bore being enlarged and flaring outwardly and upwardly thereby forming a landing for a tubing suspension means, the lower end portion of said bore being adapted to receive the end of a casing string; means carried by the lower section of said tubing head body for connecting said tubing head body to a string of casing, the lower section of the tubing head body including a downwardly directed seating surface provided with seal means adapted to seat upon a landing surface of a casing head.

8. A tubing head means for attaching to a string of casing and for supporting a tubing string and adapted to be passed through a blowout preventer, comprising: a tubing head body having a through bore, the upper end portion of said bore being enlarged and flaring outwardly and upwardly thereby forming a conical entry portion, the lower end portion of said bore being provided with internal threads adapted to receive and engage the threaded end of a casing string; a landing surface for a tubing suspension means carried by said tubing head; the lower section of said tubing head body being provided with an integral upset head having an external downwardly directed conical seating surface provided with seal means and adapted to seat upon a landing surface of a casing head; a coupling means carried by the upper section of said tubing head body; and a removably plugged production outlet in the tubing head body between said coupling means and said downwardly directed conical seating surface.

9. A tubing head means for supporting a casing string and an internally disposed tubing string and adapted to be passed through a blowout preventer comprising: an upper tubing head body portion having a through bore, the upper end portion of said bore flaring upwardly and outwardly to form a conical entry portion and seat for a tubing plug; coupling means carried by the upper end of said upper tubing head body portion; the lower portion of said through bore of the tubing head body being provided with means to receive and hold the end of a casing string, said means including a spider provided with an external, downwardly directed seating surface adapted to rest upon a cooperating surface of a casing head, means for connecting the spider to the lower end of the upper tubing head body portion, and means carried by the spider for engagement with a casing string extending therethrough into the tubing head body, and a production outlet in the tubing head body above said spider for communication with space between said body and tubing string extending therethrough.

10. A tubing head means for supporting a casing string and an internally disposed tubing string and adapted to be passed through a blowout preventer comprising: an upper tubing head body portion having a through bore, an upwardly directed seat for a tubing plug adjacent said bore and coupling means carried by the upper end of said upper tubing head body portion; the lower portion of said through bore being adapted to receive the end of a casing string, and cooperating with a spider provided with an external, downwardly directed conical seating surface adapted to rest upon a cooperating surface of a casing head, means for connecting the spider to the lower end of the upper tubing head body portion, and means carried by the spider for engagement with a casing string extending therethrough into the through bore of the tubing head body, said last-named means including a continuous, circumferential seal means adapted to sealingly contact such casing; and a production outlet in the tubing head body and above said spider for communication with space between said body and tubing string extending therethrough.

11. A tubing head means for engaging and supporting a tubing string and a casing string and adapted to be passed through a blowout preventer comprising: a tubing head body having a through bore, the upper end portion of said bore flaring outwardly and upwardly thereby forming a conical entry portion, the lower end of said bore being adapted to receive the end of a casing string; the lower section of said tubing head body having a radially outwardly extending shoulder; the upper section of said tubing head body being provided with coupling means; removably plugged production outlets in said tubing head body between said coupling means and said outwardly extending shoulder; a spider comprising an annular portion and a downwardly and inwardly extending skirt portion, said spider having an internal shoulder between said annular portion and said skirt portion, said annular portion provided with internal threads, said spider having an external inwardly and downwardly directed conical seating surface provided with seal means; a gland ring adapted to seat on said internal shoulder of said spider; packing means between said shoulder on said tubing head body and said gland ring; ring nut means adapted to seat on said outwardly extending shoulder of said tubing head body and engage said internal threads on the annular portion of said spider, whereby said spider is secured to said tubing head body; and slip means between said skirt portion of said spider and said casing whereby said casing is connected to said tubing head means.

12. A tubing head adapter adapted to pass through a blowout preventer and to engage a tubing head comprising: an adapter body portion provided with a through bore, the upper end portion of said bore having internal threads adapted to engage the threaded end of a landing nipple; a radially outwardly extending shoulder, integral with said adapter body and provided with a downwardly depending lip having internal threads for engaging said tubing head; and a downwardly extending skirt integral with said adapter body provided with an external upwardly and outwardly expanding conical surface, the inner diameter of said skirt corresponding to the through bore in said adapter body portion.

13. A tool guide adapted to pass through a blowout preventer and engage a tubing head comprising: an upper funnel-shaped section having an internal bore; a radially outwardly extending shoulder integral with said funnel-shaped section having a downwardly depending annular lip, said lip being provided with internal threads, whereby said tool guide may be attached to a tubing head; a downwardly depending skirt section integral with the lower end of said funnel section, the outer surface of said skirt portion expanding outwardly and upwardly forming an external conical surface, the inner diameter of said skirt being adapted to permit passage of a drilling tool and guide said tool through said tubing head.

14. Apparatus for use in well operations comprising: a casing head adapted to be connected to a casing, the upper portion of said casing head including an internal upwardly and outwardly expanding frusto-conical landing surface said upper portion provided with external threads; a tubing head means having a through bore, the upper portion of said bore flaring outwardly and upwardly forming a conical entry portion and seat for a tubing suspension plug, the lower portion of said tubing head means including means for connecting said tubing head to a string of pipe, said tubing head means having a downwardly directed conical seating surface, provided with seal means, adapted to seat on the landing surface of said casing head, the upper portion of said tubing head means provided with coupling means, said tubing head having a lateral production outlet provided with a selectively removable plug between said coupling means and said downwardly directed conical seating surface; a tubing suspension plug having a through bore provided with means for connecting the same to a string of tubing, said tubing plug including a downwardly directed conical head provided with sealing means adapted to cooperatively seat on the flaring entry portion of said tubing head, whereby a tubing string may be suspended from the tubing head, the annular space between the tubing string and string of pipe suspended from said tubing head being in communication with the lateral plugged outlets of said tubing head; clamping means adapted to engage said threads of the upper portion of said casing head and the tubing head whereby said tubing head is secured to said casing head; and clamping means adapted to engage the coupling means provided in the upper portion of said tubing head and the tubing plug whereby said tubing suspension plug is secured to said tubing head.

15. In an apparatus for facilitating well head operations wherein the surface equipment includes a blowout preventer above a casing head, the combination of: a tubing head means adapted to be passed through a blowout preventer, said tubing head having a through bore, the upper end portion of said bore expanding outwardly and upwardly forming a flaring entry portion; means carried by the lower portion of said tubing head for connecting the same with a string of pipe and including a downwardly directed, conical seating surface provided with seal means, an upper portion provided with coupling means, and a removably plugged lateral production outlet between said upper and lower portions; and a removable landing adapter attachable to the upper end of the tubing head means, said adapter having a through bore, the upper end portion of said bore provided with coupling means for engaging a landing nipple, said adapter including a skirt extending into the flaring entry portion of said tubing head means whereby a virtually uniform bore is established through said tubing head.

16. *An apparatus for facilitating well head operations which in assembly comprises an upwardly extending surface casing from the well bore, the casing head secured to the upper end of said casing and having a landing surface, a blowout preventer mounted on said casing head and having a through bore, and a tubing head carrying an inner casing and seated on said landing surface whereby said tubing head is supported directly by said casing head, said blowout preventer supported by said casing head independently of said tubing head, said tubing head having external cross sectional dimensions smaller than said through bore whereby said tubing head may readily be passed through said blowout preventer while the latter remains supported by said casing head, said tubing head having an upwardly facing seating surface with which a suspension member for an inner tubing is engageable.*

17. *An apparatus as set forth in claim 16 wherein a guide spool is supported on said casing head below said blowout preventer and between the latter and said casing head, said spool having a bore at least as large in diameter as said through bore and through which said tubing head may be passed from said through bore toward its seated position on said landing surface of said casing head.*

18. *An apparatus as set forth in claim 17 wherein said guide spool has passage means along the inner walls of its bore for the passage of fluid past said tubing head as said tubing head is lowered through said spool bore toward its seated position on said landing surface.*

19. *An apparatus as set forth in claim 18 wherein said spool provides spaced guiding means extending longitudinally through its bore for guiding and centering said tubing head as it is lowered through said spool toward its seated position on said landing surface, said fluid passage means being formed between said spaced guiding means whereby fluid may flow by said tubing head as the latter is passed through said spool bore.*

20. *An apparatus for facilitating well head operations which in assembly comprises an upwardly extending surface casing from the well bore, the casing head secured to the upper end of said casing and having a landing surface, a blowout preventer mounted on said casing head and having a through bore, a tubing head carrying an inner casing and seated on said landing surface whereby said tubing head is supported directly by said casing head, said tubing head having external cross sectional dimensions smaller than said through bore whereby said tubing head may readily be passed through said blowout preventer, said tubing head having an upwardly facing seating surface, and a tubing suspension member seated on said seating surface and by which an inner tubing is suspended within said inner casing.*

21. *An apparatus as set forth in claim 20 wherein said tubing head has an internal chamber below its seating surface and above its seat on said landing surface, said chamber communicating with the space between said inner casing and said inner tubing and said tubing head has a lateral production outlet communicating with said chamber whereby fluid may flow from said space to said outlet when said tubing suspension member is seated on said seating surface of said tubing head.*

22. *Apparatus as set forth in claim 20 wherein said tubing head has passage means below said seating surface for the flow of fluid in the space between said inner casing and the inner tubing.*

23. *An apparatus as set forth in claim 22 wherein additional passage means is provided in said casing head below said landing surface for permitting when said tubing head is in seated position fluid flow in the space between said surface casing and said inner casing.*

References Cited in the file of this patent or the original patent

UNITED STATES PATENTS

| | | |
|---|---|---|
| 1,875,266 | Santiago | Aug. 30, 1932 |
| 1,967,417 | Martin | July 24, 1934 |
| 2,002,012 | Howard | May 21, 1935 |
| 2,009,200 | Penick et al. | July 23, 1935 |
| 2,044,590 | Neuhaus | June 16, 1936 |
| 2,067,499 | Millmine | Jan. 12, 1937 |
| 2,117,444 | Mueller et al. | May 17, 1938 |
| 2,148,327 | Smith et al. | Feb. 21, 1939 |
| 2,187,840 | Penick | Jan. 23, 1940 |
| 2,194,255 | Allen | Mar. 19, 1940 |
| 2,228,555 | Barker | Jan. 14, 1941 |
| 2,546,638 | Humason | Mar. 27, 1951 |